(12) United States Patent
Vargas

(10) Patent No.: US 9,126,278 B2
(45) Date of Patent: Sep. 8, 2015

(54) TEMPLATE FOR FORMING COOLING PASSAGES IN A TURBINE ENGINE COMPONENT

(75) Inventor: Ivan F. Oliver Vargas, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 431 days.

(21) Appl. No.: 13/585,897

(22) Filed: Aug. 15, 2012

(65) Prior Publication Data

US 2014/0048515 A1 Feb. 20, 2014

(51) Int. Cl.
*B23H 9/10* (2006.01)
*B23H 9/14* (2006.01)
*B23H 1/00* (2006.01)

(52) U.S. Cl.
CPC .. *B23H 9/10* (2013.01); *B23H 9/14* (2013.01); *B23H 1/00* (2013.01)

(58) Field of Classification Search
CPC .............. B23H 1/00; B23H 9/10; B23H 9/14; B23H 11/00
See application file for complete search history.

(56) References Cited

U.S. PATENT DOCUMENTS

| | | | | |
|---|---|---|---|---|
| 3,120,482 | A * | 2/1964 | Williams | 204/224 M |
| 3,316,626 | A | 5/1967 | Fredericks | |
| 3,536,603 | A | 10/1970 | Bonga | |
| 3,719,579 | A * | 3/1973 | Cross et al. | 219/69.15 |
| 4,159,407 | A | 6/1979 | Wilkinson et al. | |
| 4,197,443 | A | 4/1980 | Sidenstick | |
| 4,256,555 | A | 3/1981 | Wilson et al. | |
| 4,278,245 | A * | 7/1981 | DiBattista et al. | 204/224 M |
| 4,529,493 | A | 7/1985 | Rager | |
| 4,650,949 | A | 3/1987 | Field | |
| 4,819,325 | A | 4/1989 | Cross et al. | |
| 4,922,076 | A | 5/1990 | Cross et al. | |
| 5,413,463 | A | 5/1995 | Chiu et al. | |
| 5,957,657 | A | 9/1999 | Akita et al. | |
| 6,844,518 | B1 * | 1/2005 | Coons et al. | 219/69.15 |
| 7,126,075 | B2 | 10/2006 | Bailey et al. | |
| 8,168,912 | B1 | 5/2012 | Liang | |
| 2006/0275553 | A1 | 12/2006 | Subramanian | |

(Continued)

FOREIGN PATENT DOCUMENTS

| | | | |
|---|---|---|---|
| DE | 10255455 A1 * | 6/2004 | |
| JP | 61-178123 A * | 8/1986 | |

(Continued)

OTHER PUBLICATIONS

Machine translation of JP 08-118,157, Nov. 2014.*

*Primary Examiner* — Geoffrey S Evans

(57) ABSTRACT

A reusable template for simultaneously forming a plurality of cooling passages in a component for use in a turbine engine includes a first surface defining an electrode entry surface, a second surface opposed from the first surface and defining a component mating surface, and a plurality of electrode passages pre-formed in the template and extending from the first surface to the second surface. The second surface of the template has a shape that corresponds to an outer surface of the component such that the template is capable of being snugly positioned against the outer surface of the component. During an electro-discharge machining operation, a plurality of electrodes are simultaneously inserted through the pre-formed electrode passages in the template and into the component while supplying an electric current to the electrodes to remove material from the component so as to form the cooling passages therein.

20 Claims, 3 Drawing Sheets

(56) References Cited

U.S. PATENT DOCUMENTS

2007/0264566 A1* 11/2007 Arndt et al. .................. 429/208
2010/0108644 A1    5/2010 Berger et al.
2010/0313405 A1* 12/2010 Mohyi Hapipi et al. ... 219/69.15

FOREIGN PATENT DOCUMENTS

| | | | |
|---|---|---|---|
| JP | H02243223 A | | 9/1990 |
| JP | 08-118157 A | * | 5/1996 |
| KR | 20120128013 A | | 11/2012 |

* cited by examiner

TEMPLATE FOR FORMING COOLING PASSAGES IN A TURBINE ENGINE COMPONENT

FIELD OF THE INVENTION

The present invention relates to forming cooling passages in turbine engine components via electro-discharge machining using a template.

BACKGROUND OF THE INVENTION

In a turbomachine, such as a turbine engine, air is pressurized in a compressor section then mixed with fuel and burned in a combustion section to generate hot combustion gases. The hot combustion gases are expanded within a turbine section of the engine where energy is extracted to provide output power used to produce electricity.

Components within the combustion section and the turbine section directly exposed to the hot combustion gases, such as, for example, rotating and stationary airfoils, i.e., blades and vanes, and flow path defining components, e.g., shrouds, platforms, ring segments, liners, transition ducts, etc., may be provided with internal cooling circuits that channel a cooling fluid, such as compressor discharge air, through the component. These types of components may also include film cooling passages that extend through external walls thereof for discharging the cooling air to the outside of the component to form a thin layer of film cooling air, which protects the component from the hot combustion gases.

Over time the external walls of components that are exposed to the hot combustion gases may deteriorate, which may deform the film cooling passages formed therein, thus reducing or destroying the functionality of the film cooling passages. Further, the film cooling passages may become blocked or clogged with debris that is picked up and carried by the hot combustion gases. In such cases, it may become necessary to re-form the cooling passages in the walls of the components.

SUMMARY OF THE INVENTION

In accordance with a first aspect of the present invention, a system is provided for forming a plurality of cooling passages in a component for use in a turbine engine. The system comprises an electrode holder, a plurality of electrodes extending from and structurally supported by the electrode holder, and a template. The template has a first surface defining an electrode entry surface, a second surface opposed from the first surface and defining a component mating surface, and a plurality of electrode passages pre-formed in the template and extending from the first surface to the second surface. The second surface of the template has a shape that corresponds to an outer surface of the component such that the template is capable of being snugly positioned against the outer surface of the component. During an electro-discharge machining operation, the electrodes are simultaneously inserted through the pre-formed electrode passages in the template and into the component while supplying an electric current to the electrodes to remove material from the component so as to form the cooling passages therein.

In accordance with a second aspect of the present invention, a method is provided for simultaneously forming a plurality of cooling passages in a component to be used in a turbine engine. A non-conductive template is placed up against an outer surface of the component such that a component mating surface of the template fits snugly against the outer surface. A plurality of electrodes are inserted through corresponding pre-formed electrode passages formed in the template. An electro-discharge machining operation is performed to simultaneously form a plurality of cooling passages in the component and comprises inserting the plurality of electrodes into the component while supplying an electric current to the electrodes so as to remove material from the component to simultaneously form the cooling passages.

In accordance with a third aspect of the present invention, a reusable template is provided for simultaneously forming a plurality of cooling passages in a component for use in a turbine engine. The template comprises a first surface defining an electrode entry surface, a second surface opposed from the first surface and defining a component mating surface, and a plurality of electrode passages pre-formed in the template and extending from the first surface to the second surface. The second surface of the template has a shape that corresponds to an outer surface of the component such that the template is capable of being snugly positioned against the outer surface of the component. During an electro-discharge machining operation, a plurality of electrodes are simultaneously inserted through the pre-formed electrode passages in the template and into the component while supplying an electric current to the electrodes to remove material from the component so as to form the cooling passages therein.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

After periods of use, it may become necessary to re-form cooling passages in turbine engine components, such as, for example, airfoils, i.e., rotating blades or stationary vanes, or flow path defining components, e.g. shrouds, platforms, ring segments, liners, transition ducts, etc., as the cooling passages in these components may become deformed by wear over time, including being blocked or clogged.

Figure 1:
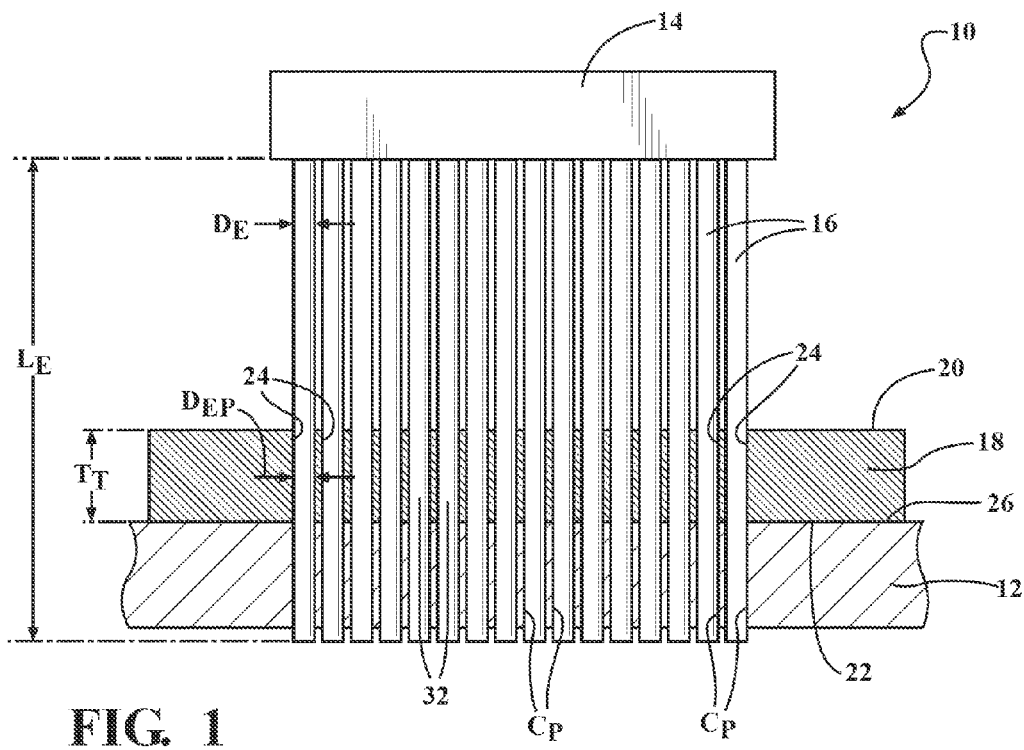
FIG. 1 is a schematic illustration of a system used for forming a plurality of cooling passages in a component in accordance with the present invention.

Referring to FIG. 1, a system 10 is schematically illustrated for forming a plurality of cooling passages $C_P$ in a component 12 for use in a turbine engine. The system 10 comprises an electrode holder 14, a plurality of electrodes 16 extending from and structurally supported by the electrode holder 14, and a template 18. In the illustrated embodiment, a ratio of a length $L_E$ of the electrodes 16 to a diameter $D_E$ of the electrodes 16 is at least about 10 to 1, as shown in FIG. 1.

The template 18 includes a first surface 20 defining an electrode entry surface, a second surface 22 opposed from the first surface 20 and defining a component mating surface, and a plurality of electrode passages 24. The template 18 is preferably formed from a non-conductive material, such as a polymer, or coated with a non-conductive material using any suitable coating procedure. Hence, electric current supplied to the electrodes 16 during an electro-discharge machining (EDM) operation is not transferred through the template 18, which EDM operation is used to form the cooling passages $C_P$ in the component 12 as will be described below. Moreover, the template 18 is preferably formed from a shape retaining material such that the template 18 is not deformed during the EDM operation and such that the template 18 can be reused in subsequent EDM operations to form cooling passages in other components similar to the component 12.

As shown FIG. 1, a thickness $T_T$ of the template 18 is preferably in a range of from about 3.5 mm to about 6 mm, and is a most preferred embodiment is about 4.0 mm. Such a thickness $T_T$ of the template 18 is provided to aid in alignment of the electrodes 16 by providing the template 18 with enough structural rigidity to substantially preserve the size, shape, and orientation angle of the cooling passages $C_P$ during the EDM operation.

As shown in FIG. 1, the second surface 22 of the template 18 has a shape that corresponds to an outer surface 26 of the component 12 such that the template 18 is capable of being snugly positioned against the outer surface 26 of the component 12. It is noted that while the second surface 22 of the template 18 and the outer surface 26 of the component 12 illustrated in FIG. 1 are generally planar surfaces, these surfaces 22, 26 could have any shape depending on the type of the component 12 in which the cooling passages $C_P$ are to be formed. For example, if the component 12 is a suction side of an airfoil, the outer surface 26 of the component 12 may be defined by a generally convex wall having leading and trailing edges that extend between radially inner and outer ends of the airfoil, as will be apparent to those having ordinary skill in the art. As another example, if the component 12 is a pressure side of an airfoil, the outer surface 26 of the component 12 may be defined by a generally concave wall having leading and trailing edges that extend between radially inner and outer ends of the airfoil, as will be apparent to those having ordinary skill in the art. As yet another example, if the component 12 is a flowpath defining component, such as, for example, a shroud, platform, ring segment, liner, transition duct, etc., the outer surface 26 of the component 12 would be defined by a corresponding outer wall portion of the component 12, as will be apparent to those having ordinary skill in the art, and an example of which is shown in FIG. 3, wherein the component 12 comprises an inner shroud 28 that is associated with a non-rotating airfoil 30 for use in the turbine section of the engine.

According to an aspect of the present invention, the electrode passages 24 are pre-formed in the template 18, i.e., the electrode passages 24 are formed in the template 18 before the template 18 is used in the EDM operation as will be described below, and extend from the first surface 20 of the template 18 to the second surface 22 of the template 18. While the exemplary electrode passages 24 illustrated in FIG. 1 extend at an angle of about 90° relative to the first and second surfaces 20, 22 of the template 18, the electrode passages 24 could extend at any suitable angle through the template 18 depending on the angle in which the cooling passages $C_P$ are to be formed in the component 12.

Figure 2:
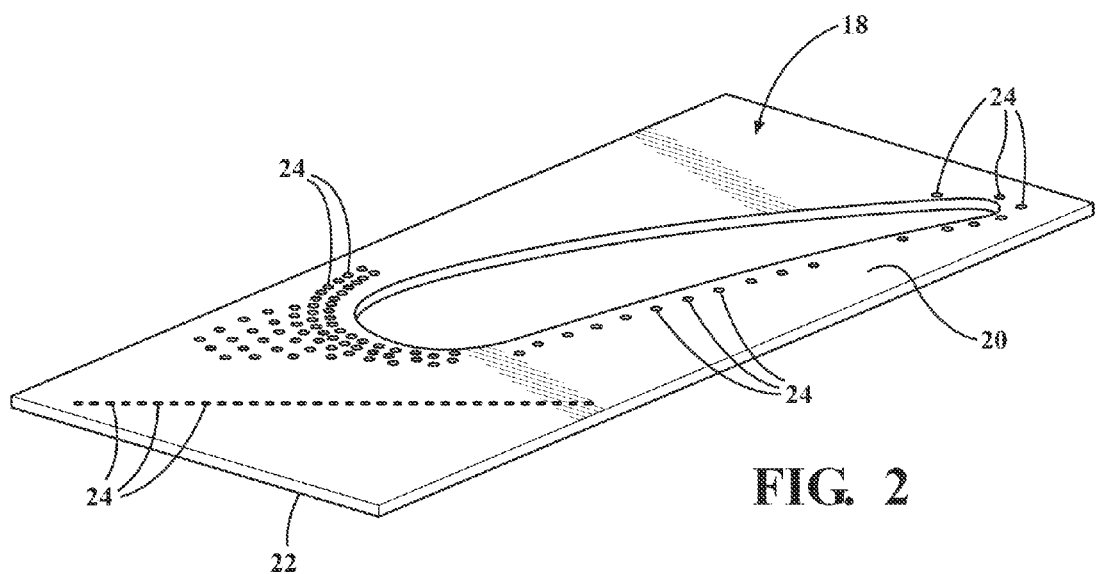
FIG. 2 is a top plan view of an exemplary template that can be used in the system of FIG. 1 and illustrates the shape of the template and a plurality of pre-formed electrode passages formed through the template.
Figure 3:
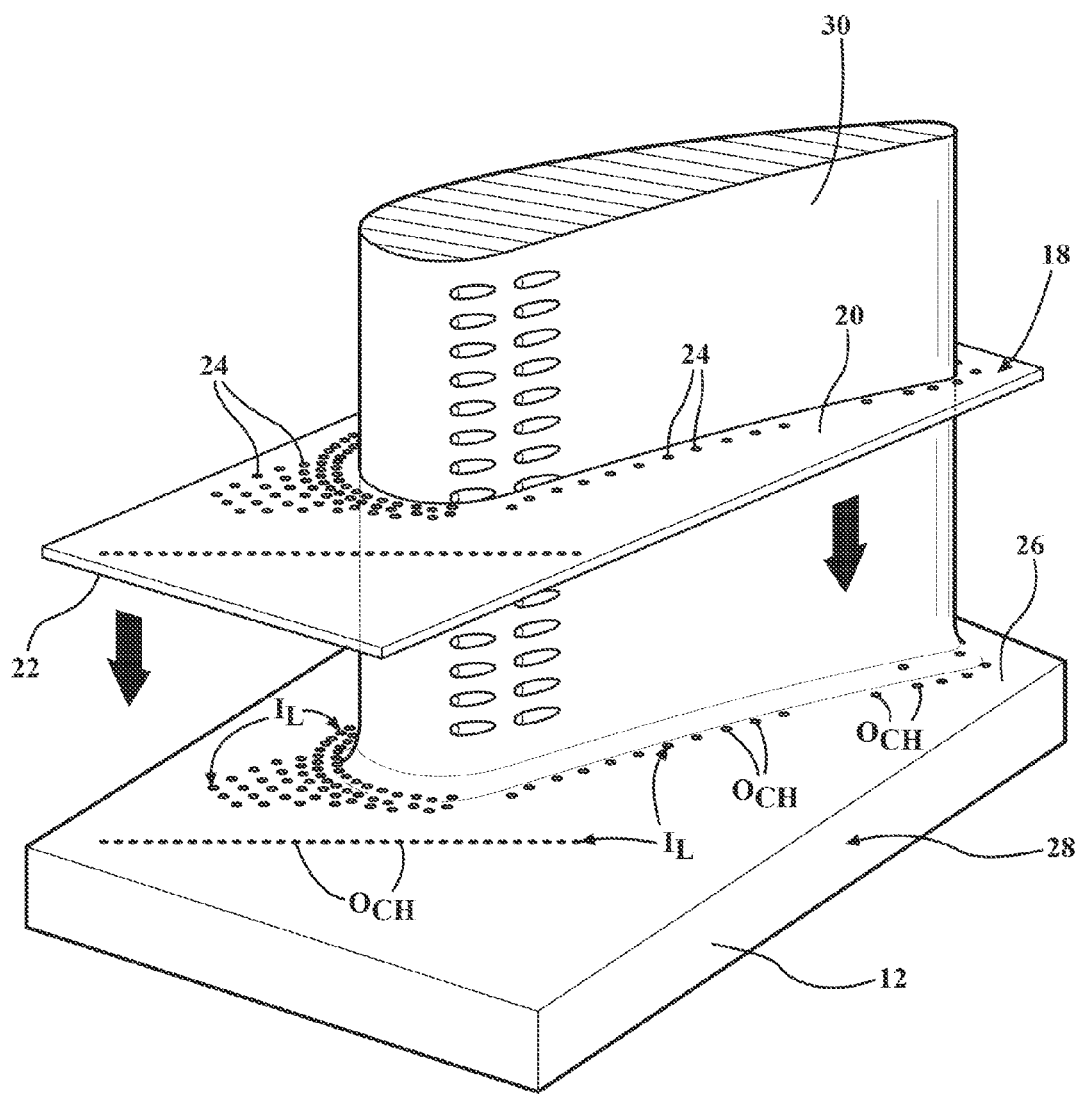
FIG. 3 is a perspective view of the template of FIG. 2 being positioned onto a surface of a component that is to have cooling passages formed therein in accordance with the present invention.

Referring now to FIGS. 1-3, a method for simultaneously forming a plurality of cooling passages $C_P$, also referred to herein as replacement cooling passages $C_P$, in a component 12 to be used in a turbine engine using an EDM operation will now be described.

A template 18, such as the template 18 described above, is placed up against an outer surface 26 of the component 12 such that the second surface 22, i.e., the component mating surface, of the template 18 fits snugly against the outer surface 26 of the component 12, see FIG. 1. In accordance with an aspect of the present invention, the template 18 is placed up against the outer surface 26 of the component 12 such that the electrode passages 24 that extend through the template 18 are aligned with initial locations $I_L$ of original cooling holes $O_{CH}$ (see FIG. 3) in the component 12, wherein at least some of the original cooling holes $O_{CH}$ have been deformed by wear and are in need of being re-formed. Placing the template 18 snugly up against the outer surface 26 of the component 12 in this manner ensures that the replacement cooling passages $C_P$ are formed in the component 12 in the initial locations $I_L$ of the original cooling holes $O_{CH}$ and substantially prevents the template 18 from inadvertently being moved during the EDM operation.

As shown in FIG. 3, the second surface 22 of the template 18 is preferably configured so as to cover an entire outer surface of the component 12 that is being serviced, which component 12 illustrated in FIG. 3 comprises an inner shroud 28 as noted above. Further, the template 18 preferably includes corresponding electrode passages 24 for each of the cooling passages $C_P$ to be formed in the entire surface of the component 12, such that the template 18 does not need to be repositioned during the EDM operation.

As noted above, the replacement cooling passages $C_P$ formed in accordance with the present invention may be formed in any one of a number of components 12, such as airfoils or flow path defining components. Since the outer surfaces 26 of these different types of components 12 are all different from one another, an appropriate template 18 is selected for use in a given EDM operation from a group of templates 18 depending on the type of the component 12 that is to be serviced, e.g., depending on the shape of the outer surface 26 of the component 12. Further, since the shapes and cooling passage configurations provided in similar parts in different engines of the same type are often consistent from engine to engine, the templates 18 can be used multiple times for servicing similar parts from different engines, such as to form cooling passages $C_P$ at the same locations and with the same shape in multiple parts. For example, a template 18 that is used to form cooling passages $C_P$ in a suction side of an airfoil may be repeatedly used to subsequently form cooling passages $C_P$ in suction sides of a plurality of other generally identical airfoils.

Once the template 18 is in place on the component 12, an electrode holder 14 that supports a plurality of electrodes 16 as described above is maneuvered such that the electrodes 16 are inserted into and through the electrodes passages 24 of the template 18. As noted above, the electrode passages 24 are pre-formed in the template 18 such that the electrodes 16 are not required to form the electrode passages 24 in the template 18. Preferably, diameters $D_{EP}$ (see FIG. 1) of the electrode passages 24 are slightly larger than the diameters $D_E$ of the electrodes 16 so that the electrodes 24 can be easily inserted into and through the electrode passages 24. However, the diameters $D_{EP}$ of the electrode passages 24 are preferably not significantly larger than the diameters $D_E$ of the electrodes 16 so that the template 18 is able to provide structural support for portions 32 of the electrodes 16 distal from the electrode holder 14 during the cooling passage $C_p$ forming method, see FIG. 1. For example, the diameters $D_{EP}$ of the electrode passages 24 may be about 0.125 mm larger than the diameters $D_E$ of the electrodes 16. The support for the portions 32 of the electrodes 16 distal from the electrode holder 14 provided by the template 18 is believed to reduce or prevent damage to the electrodes 16, which could otherwise be caused by bending and/or twisting of the electrodes 16 during the EDM operation if the portions 32 were not supported by the template 18.

The electrodes 16 are inserted through the pre-formed electrode passages 24 in the template 18 and into the component 12 while supplying an electric current to the electrodes 16 to remove material from the component 16, which simultaneously forms a plurality of cooling passages $C_P$ therein, i.e., a corresponding number of cooling passages $C_P$ to the number of electrodes 16 supported by the electrode holder 14 are formed in the component 12.

The template 18 advantageously serves as a guide to simultaneously forming multiple cooling passages $C_P$ in the component 12 via the EDM procedure. Further, since the template 18 reduces or prevents damage to the electrodes 16, servicing efficiency, including time, cost, and accuracy of cooling passage re-formation, is believed to be improved. Moreover, since the template 18 is preferably formed from a shape retaining material, the template 18 is typically not deformed during use such that it can be used repeatedly for forming cooling passages $C_P$ in similar parts.

It is noted that if the template 18 is formed from a non-conductive material, such as a polymer, it may be formed using rapid prototyping procedure. If the template 18 is formed from a metal and coated with a non-conductive material, the template 18 may be formed using cutouts of existing components, e.g., using the suction side or pressure side of an airfoil, or using the flow path defining surface of a flow path defining component. Moreover if the template 18 is formed from a metal and coated with a non-conductive material, the electrode passages 24 may be formed with diameters that are about 0.915 mm larger than the desired diameter $D_{EP}$ to compensate for the non-conductive material coating application.

Figure 4:
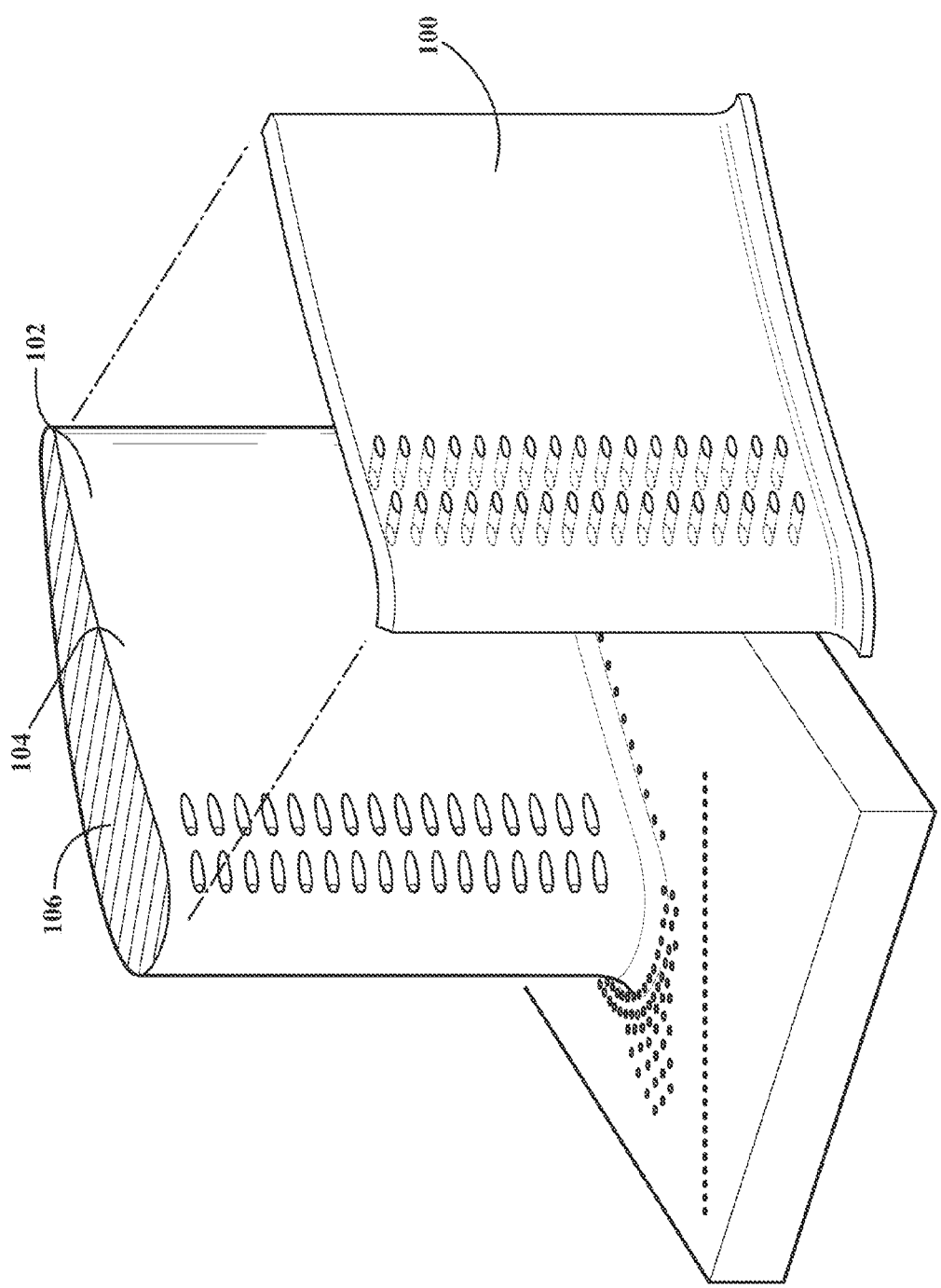
FIG. 4 is a perspective view showing another exemplary template that can be used in the system of FIG. 1 for forming a plurality of cooling passages in a component.

Referring now to FIG. 4, a template 100 constructed in accordance with another embodiment of the invention is illustrated. The exemplary template 100 illustrated in FIG. 4 has the shape of an outer surface 102 of a pressure side 104 of an airfoil 106 and can be repeatedly used to form cooling passages in airfoil pressure sides as described above with reference to FIGS. 1-3. The template 100 illustrated in FIG. 4 has the shape of one of many types of templates that could be utilized to form cooling passages in turbine engine components according to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for forming a plurality of cooling passages in a component for use in a turbine engine comprising:
    an electrode holder;
    a plurality of electrodes extending from and structurally supported by the electrode holder; and
    a template having a first surface defining an electrode entry surface, a second surface opposed from the first surface and defining a component mating surface, and a plurality of electrode passages pre-formed in the template and extending from the first surface to the second surface, the second surface of the template having a shape that corresponds to an outer surface of the component such that the template is capable of being snugly positioned against the outer surface of the component, wherein the template includes corresponding electrode passages for each of the cooling passages to be formed in the entire surface of the component;
    wherein, during an electro-discharge machining operation, the electrodes are simultaneously inserted through the pre-formed electrode passages in the template and into the component while supplying an electric current to the electrodes to remove material from the component so as to form the cooling passages therein.

2. The system according to claim 1, wherein the template is at least one of:
    formed from a non-conductive material; and
    coated with a non-conductive material.

3. The system according to claim 1, wherein the template is formed from a shape retaining material.

4. The system according to claim 1, wherein the electrode passages are aligned with initial locations of original cooling holes in the component that were deformed by wear such that the cooling passages formed in the component via the electro-discharge machining operation are formed in the initial locations.

5. The system according to claim 1, wherein a thickness of the template is in a range of about 3.5 mm to about 6 mm.

6. The system according to claim 1, wherein the template is selected from a group of templates depending on the shape of the outer surface of the component.

7. The system according to claim 1, wherein the template comprises a reusable template.

8. The system according to claim 1, wherein the second surface of the template covers an entire surface of the component in which cooling passages are to be formed.

9. The system according to claim 8, wherein the entire surface of the component comprises one of:
    a suction side surface or a pressure side surface of an airfoil; and
    a flow path defining surface of a shroud, platform, ring segment, liner, or transition duct.

10. The system according to claim 1, wherein the template supports portions of the electrodes distal from the electrode holder as the electrodes are being inserted into component.

11. The system according to claim 10, wherein a ratio of a length of the electrodes to a diameter of the electrodes is at least about 10 to 1.

12. A method for simultaneously forming a plurality of cooling passages in a component to be used in a turbine engine comprising:
    placing a non-conductive template up against an outer surface of the component such that a component mating surface of the template fits snugly against the outer surface;
    inserting a plurality of electrodes through corresponding pre-formed electrode passages formed in the template, the template including corresponding electrode passages for each of the cooling passages to be formed in the entire surface of the component; and performing an electro-discharge machining operation to simultaneously form a plurality of cooling passages in the component comprising:
  inserting the plurality of electrodes into the component while supplying an electric current to the electrodes so as to remove material from the component to simultaneously form the cooling passages.

13. The method according to claim 12, further comprising, before placing the template up against the outer surface of the component, selecting an appropriate template from a group of templates based on the shape of the component.

14. The method according to claim 12, wherein placing the template up against the outer surface of the component comprises aligning the pre-formed electrode passages with initial locations of original cooling holes in the component that were deformed by wear such that the cooling passages formed in the component via the electro-discharge machining operation are formed in the initial locations.

15. The method according to claim 12, wherein:
  placing the template up against the outer surface of the component comprises covering, with the template, an entire surface of the component in which cooling passages are to be formed.

16. The method according to claim 12, further comprising reusing the template in a subsequent electro-discharge machining operation to form a plurality of cooling passages in a second component, wherein the same pre-formed electrode passages formed in the template are used for insertion of a plurality of electrodes into the second component.

17. A reusable template for simultaneously forming a plurality of cooling passages in a component for use in a turbine engine comprising:
  a first surface defining an electrode entry surface;
  a second surface opposed from the first surface and defining a component mating surface; and
  a plurality of electrode passages pre-formed in the template and extending from the first surface to the second surface, the second surface of the template having a shape that corresponds to an outer surface of the component such that the template is capable of being snugly positioned against the outer surface of the component, wherein the second surface is provided to cover the entire surface of the component in which the cooling passages are to be formed;
  wherein, during an electro-discharge machining operation, a plurality of electrodes are simultaneously inserted through the pre-formed electrode passages in the template and into the component while supplying an electric current to the electrodes to remove material from the component so as to form the cooling passages therein.

18. The template according to claim 17, wherein the template includes corresponding electrode passages for each of the cooling passages to be formed in the entire surface of the component.

19. The template according to claim 17, wherein the template is at least one of:
  formed from a shape retaining material;
  formed from a non-conductive material; and
  coated with a non-conductive material.

20. The template according to claim 17, wherein the electrode passages are aligned with initial locations of original cooling holes in the component that were deformed by wear such that the cooling passages formed in the component via the electro-discharge machining operation are formed in the initial locations.

* * * * *